US010215273B2

(12) United States Patent
Smith

(10) Patent No.: US 10,215,273 B2
(45) Date of Patent: Feb. 26, 2019

(54) METHOD FOR INSTALLATION OF A BUSHING INTO THE SHIFT CABLE END OF AN AUTOMATIC TRANSMISSION WITHOUT THE USE OF A COMPRESSION TOOL

(71) Applicant: Loring Smith, Lakeland, FL (US)

(72) Inventor: Loring Smith, Lakeland, FL (US)

( * ) Notice: Subject to any disclaimer, the term of this patent is extended or adjusted under 35 U.S.C. 154(b) by 0 days.

(21) Appl. No.: 15/468,167

(22) Filed: Mar. 24, 2017

(65) Prior Publication Data

US 2017/0191530 A1    Jul. 6, 2017

Related U.S. Application Data

(62) Division of application No. 14/278,400, filed on May 15, 2014.

(51) Int. Cl.
*F16C 1/14* (2006.01)
*F16H 59/04* (2006.01)
(Continued)

(52) U.S. Cl.
CPC ............ *F16H 59/042* (2013.01); *F16C 1/14* (2013.01); *F16C 1/145* (2013.01); *F16C 43/02* (2013.01);
(Continued)

(58) Field of Classification Search
CPC .......... Y10T 29/4987; Y10T 29/49872; Y10T 29/49876; Y10T 16/05; F16C 1/102;
(Continued)

(56) References Cited

U.S. PATENT DOCUMENTS 2,759,255 A * 8/1956 Prince ................. B25B 27/0028
29/235
2,978,927 A * 4/1961 Blanton ................. G05G 1/085
138/89
(Continued)

*Primary Examiner* — Jason L Vaughan
*Assistant Examiner* — Amanda J Meneghini
(74) *Attorney, Agent, or Firm* — Todd A. Jenkins

(57) ABSTRACT

Installation of a bushing into the shift cable end of an automatic transmission, without replacing the entire shift cable end, is accomplished via a method that does not require the use of compression tools and maintains the axial alignment of the bushing with the shift cable end during installation, thus preventing deformation of the shift cable end and bushing during installation, and ensuring the proper coupling of the shift cable end and shift lever. In one particular embodiment of the invention, the bushing may be installed by radially compressing the leading shoulder of the bushing and passing the bushing through the shift cable end, then releasing the leading shoulder of the bushing so that it engages the shift cable end and secures the bushing in place. This can be accomplished by pressing a bushing into the cavity of a tool having a cylindrical member with a first side and a second side, a cavity within the first side of the cylindrical member, and an elongated member extending perpendicularly from the second side of the cylindrical member, inserting said tool into one end of the shift cable end and passing the leading shoulder of the bushing beyond and through the shift cable end, thereby releasing the leading shoulder of the bushing to expand and secure the bushing.

2 Claims, 3 Drawing Sheets

(51) Int. Cl.
*F16C 43/02* (2006.01)
*F16H 61/36* (2006.01)
*F16H 57/00* (2012.01)

(52) U.S. Cl.
CPC ............. *F16H 59/04* (2013.01); *F16H 61/36* (2013.01); *F16H 2057/0062* (2013.01); *Y10T 29/49698* (2015.01); *Y10T 29/53913* (2015.01)

(58) Field of Classification Search
CPC .... F16C 1/14; F16C 1/262; F16C 1/28; F16D 2125/62
USPC .... 74/502.4, 502.6; 403/365, 366, 367, 368, 403/369, 371, 372
See application file for complete search history.

(56) References Cited

U.S. PATENT DOCUMENTS

| | | | | | |
|---|---|---|---|---|---|
| 3,209,422 | A | * | 10/1965 | Dritz | A44B 9/02 223/102 |
| 3,537,163 | A | * | 11/1970 | Steidl | B25B 27/20 29/441.1 |
| 3,822,953 | A | * | 7/1974 | Adelizzi | F16D 1/0876 285/330 |
| 5,735,021 | A | * | 4/1998 | Briggs | E05D 5/125 16/2.1 |

* cited by examiner

METHOD FOR INSTALLATION OF A BUSHING INTO THE SHIFT CABLE END OF AN AUTOMATIC TRANSMISSION WITHOUT THE USE OF A COMPRESSION TOOL

CROSS-REFERENCES TO RELATED APPLICATIONS

This application is a divisional application of application Ser. No. 14/278,400, filed May 15, 2014. The foregoing application is incorporated herein by reference in its entirety.

STATEMENT REGARDING FEDERALLY SPONSORED RESEARCH

Not Applicable.

NAMES OF PARTIES TO JOINT RESEARCH AGREEMENT

Not Applicable

REFERENCE TO A SEQUENCE LISTING

Not Applicable.

BACKGROUND OF THE INVENTION (1) Field of Invention

The present invention comprises a method for installing a bushing into the end of a transmission shift control linkage of various motor vehicles without damaging the shift cable end or the bushing. The transmission shift control linkage of many motor vehicles generally consists of a shift cable that connects the gear selector or shift lever to the motor vehicle's transmission. The shift cable end is coupled with the gear selector or shift lever via a bushing that allows for the smooth operation of the shift linkage. The bushing installed in the shift cable end of various motor vehicles consists of plastic that dries, rots and becomes brittle over time. The degradation or failure of the bushing allows the shift cable end to become decoupled from the gear selector or shift lever, making it impossible for the operator of the automobile to engage the shift and the transmission.

Presently, the failure of a transmission shift cable end bushing in various motor vehicles requires the removal and replacement of the entire shift cable. This is because the replacement of factory-installed bushings by mechanics generally involve methods utilizing conventional or makeshift tools that deform or otherwise damage the shift cable end or bushing during installation and fail to properly align the bushing with the shift cable end during installation. This results in a sub-standard repair that may not properly couple the shift cable end with the shift lever. Also, degraded factory-installed bushings are occasionally replaced with non-factory, "universal" bushings. Such bushings are not necessarily intended or tailored for any specific application and, when installed, often fail to properly engage the shift cable end, resulting in a sub-standard repair that may not properly couple the shift cable end with the shift lever. Additionally, the supply and labor costs associated with the replacement of the entire shift cable assembly are substantially greater than the supply and labor costs associated with the replacement of the shift cable bushing.

(2) Background Art

There are several bushing installation tools and methods for installing bushings into various housings, including machine housings associated with the internal components of an automatic transmission. An example of such a tool is shown in U.S. Pat. App. No. US2008/0066281, which discloses a pair of linkage bushing installation pliers that operates by coaxially forcing a linkage bushing into the receiving aperture of a machine housing. While such devices fulfill their particular purposes, the application of such tools to the problem of installing a shift cable end bushing without replacing the entire shift cable assembly is akin to using conventional or makeshift tools, which may deform or damage the shift cable end or bushing, resulting in a sub-standard repair that may not properly couple the shift cable end with the shift lever.

Additionally, U.S. Pat. No. 3,537,163 discloses a method for installing a bearing having an external annular groove into a cylindrical bore having an internal annular groove and retaining ring using an installation tool that expands the retaining ring into the annular groove to allow the bearing to pass through the bore until the retaining ring snaps into the external annular groove of the bearing. Such a method and tool have no application to the installation of a bushing in a shift cable end because a shift cable end does not utilize an internal annular groove or retaining ring. Where the method and tool in U.S. Pat. No. 3,537,163 expands a retaining ring to allow for the installation of a bushing in a specific application, the method and tool in the present invention are tailored for use with a shift cable end in that a bushing is compressed to allow it to be installed around an inner annular ridge that is fixed within the shift cable end.

SUMMARY OF THE INVENTION

It is the object of the present invention to provide a method for the prompt installation of a factory-equivalent bushing into the transmission shift cable end that does not damage the shift cable end or the bushing, maintains the alignment of the bushing with the shift cable end during the installation, ensures the proper coupling of the shift cable end and shift lever, and avoids the need of replacing the entire shift cable. In accordance with the invention, the proper installation of a transmission shift cable end bushing is achieved by a method utilizing a specialized tool and bushing that allow for the prompt installation of the bushing by hand, without the need for a compression tool.

In particular embodiments of the invention, the object of the invention may be accomplished by pressing the leading shoulder of a bushing having a compression mechanism, such as four compression notches, into the cavity of an installation tool, thereby radially compressing the leading shoulder of the bushing, and inserting the installation tool into the shift cable end aperture, and passing the installation tool through the shift cable end, allowing the leading shoulder of the bushing to radially expand around the inner annular ridge of the aperture and axially align with and secure the bushing in the shift cable end.

Such an installation tool, for example, could comprise a cylindrical member having a cavity for receiving and radially compressing the leading shoulder of a bushing. The outer diameter of the installation tool can be of a diameter that is less than the inner diameter of the shift cable end bushing housing, thereby ensuring that the leading shoulder of the bushing is radially compressed to fit through the shift cable end housing. An elongated member may be made to extend perpendicularly from the leading surface of the cylindrical member to allow for the tool to be removed from the shift cable end. The installation tool can be composed of any metal or polymer capable of supporting the invention, such as polypropylene.

DESCRIPTION OF THE DRAWINGS

FIG. 2a is a perspective illustration of an exemplary bushing for use with the method of FIG. 1a.

FIG. 2b is a perspective illustration of an exemplary bushing for use with the method of FIG. 1a.

FIG. 3a is a perspective illustration of an exemplary bushing installation tool for use with the method of FIG. 1a.

FIG. 3b is a side elevation illustration of an exemplary bushing installation tool for use with the method of FIG. 1a.

DETAILED DESCRIPTION

The degradation of a factory-installed bushing or the equivalent in the shift cable end of various motor vehicles requires the replacement of the entire shift cable, wherein the new shift cable is pre-fitted with a factory bushing or the equivalent. The replacement of the entire shift cable as a means of installing a shift cable bushing is the generally accepted method because there is no known method for the installation of a factory bushing or the equivalent that ensures the proper coupling of the shift cable and shift lever, maintains the alignment of the bushing with the shift cable end during installation, and prevents the shift cable end and bushing from being damaged during installation.

As noted above, it remained for the present inventor to recognize that devising a method for the installation of a bushing into a transmission shift cable end would provide a number of benefits, including lower supply and labor costs. The present inventor further recognized that the proper installation of a shift cable bushing in various motor vehicles could be achieved by developing a method that does not require the application of compression tools while simultaneously ensuring the axial alignment of the bushing with the shift cable end and the proper coupling of the shift cable and shift lever or gear selector.

Figure 1A:
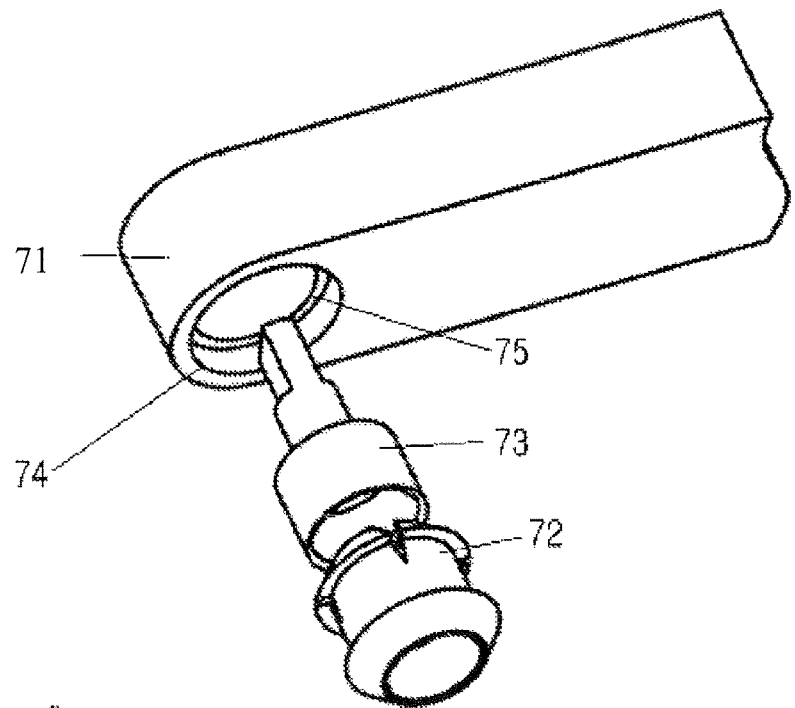
FIG. 1a is a perspective exploded view of an exemplary method, according to the present invention, for installing a bushing into a shift cable end.
Figure 1B:
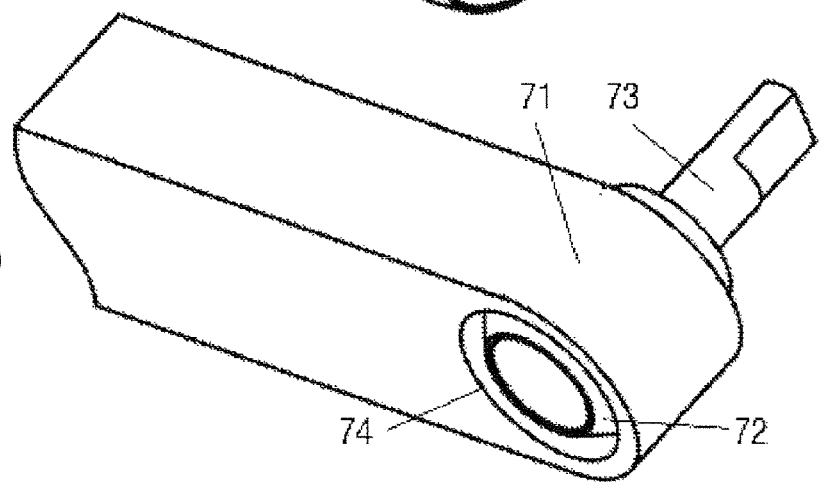
FIG. 1b is a perspective view of the exemplary method, according to the present invention, for installing a bushing into a shift cable end.

Referring to FIG. 1A and FIG. 1B, an exemplary method for installing a bushing into a shift cable end is illustrated. As illustrated, a bushing 72 is pressed inserted into the non-yieldable opening of a bushing installation tool 73, and the bushing installation tool 73 is inserted into and pulled through the shift cable end 71, thereby securing the bushing within the shift cable end 71. In this illustration, the shift cable end 71 operably couples the shift lever (not shown) with the shift cable (not shown) and allows the shift lever to engage the transmission (not shown). This particular example of a shift cable end 71 includes a coupling aperture 74 extending through the shift cable end 71 and adapted to couple with the coupling member (not shown) of the shift lever. The coupling aperture 74 has an inner annular ridge 75 that secures the bushing 72.

Figure 2A:
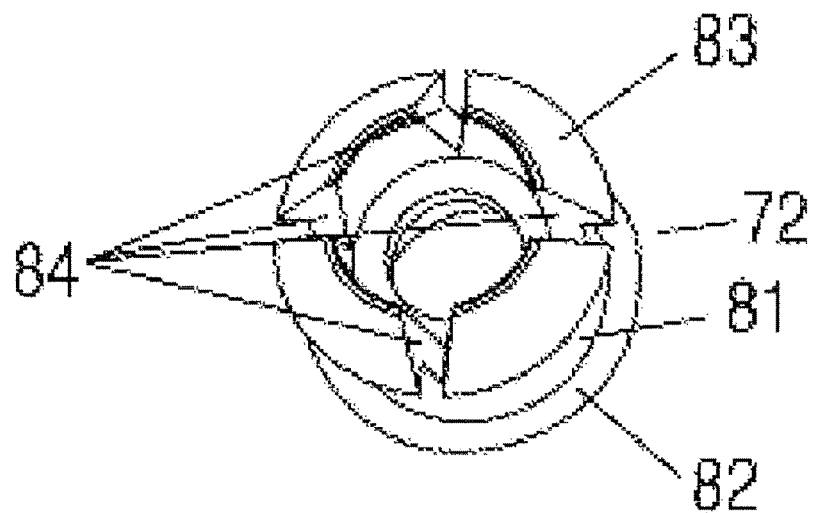
Figure 2B:
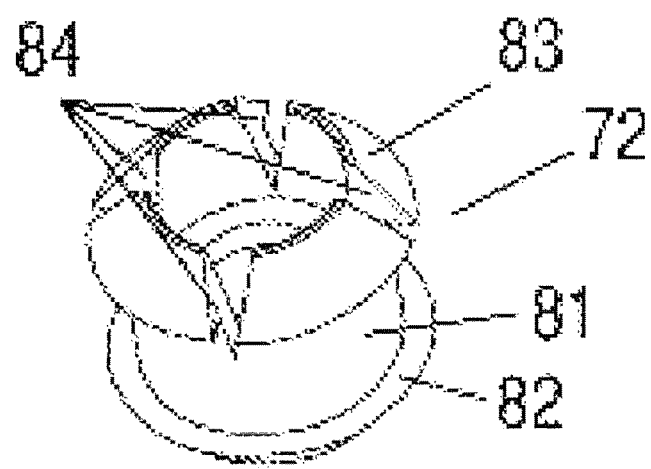

As illustrated in FIG. 2A and FIG. 2B, the bushing 72 includes a sleeve 81 with tapered shoulders of equal diameter extending radially from both ends. The trailing shoulder 82 engages the inner annular ridge 75 while the leading shoulder 83 is radially and uniformly compressed to extend through and beyond the inner annular ridge 75 to hold the bushing 72 in place. However, it remained for the present inventor to recognize that, for carrying out the new method, a bushing 72 with a mechanism that would allow for the leading shoulder 83 to be radially and uniformly compressed through and beyond the inner annular ridge 75 without being forced through the inner annular ridge by a compressive tool or other means, thus avoiding damage to the shift cable end 71 and the distortion of the bushing 72. Thus, the leading shoulder 83 of the bushing 72 is shown with a contraction mechanism that allows the leading shoulder 83 of the bushing 72 to radially and uniformly contract to extend through and beyond the inner annular ridge 75 without the force applied by a compression tool or other means, such as pliers, and allow the leading shoulder 83 of the bushing 72 to then fully expand to its original form.

In this particular embodiment, the contraction mechanism is comprised of several notches 84 spaced evenly around the periphery of the leading shoulder 83. The notches 84 in this illustration are triangular notches that collapse inward as the leading shoulder 83 of the bushing 72 is inserted into the bushing installation tool 73 75, thereby allowing the leading shoulder 83 to be radially and uniformly contract without the use of more than a nominal force or distortion, and to allow the leading shoulder 83 of the bushing 72 to fully expand to its original form. The radial and uniform contraction of the leading shoulder 83 cannot be achieved with rectangular notches or slits. Additionally, the contraction necessary to permit the bushing 72 to pass through the inner annular ridge 75 cannot be achieved with rectangular notches or slits without jeopardizing the integrity of the hushing. This particular embodiment includes four triangular notches 84 spaced quarterly around the leading shoulder 83 of the bushing 72.

A compression mechanism embodying the principles of the invention can have any desired number of compression notches. For example, if a compression mechanism is comprised of six compression notches, it is guaranteed to make the leading shoulder 83 of the bushing 72 more compressible. However, the structural strength of a leading shoulder 83 with six compression notches may become an issue. Similarly, a compression mechanism may be comprised of less than four compression notches 84. However, a compression mechanism comprised of less than four compression notches 84 may not achieve the desired compressibility of the leading shoulder 83.

Figure 3A:
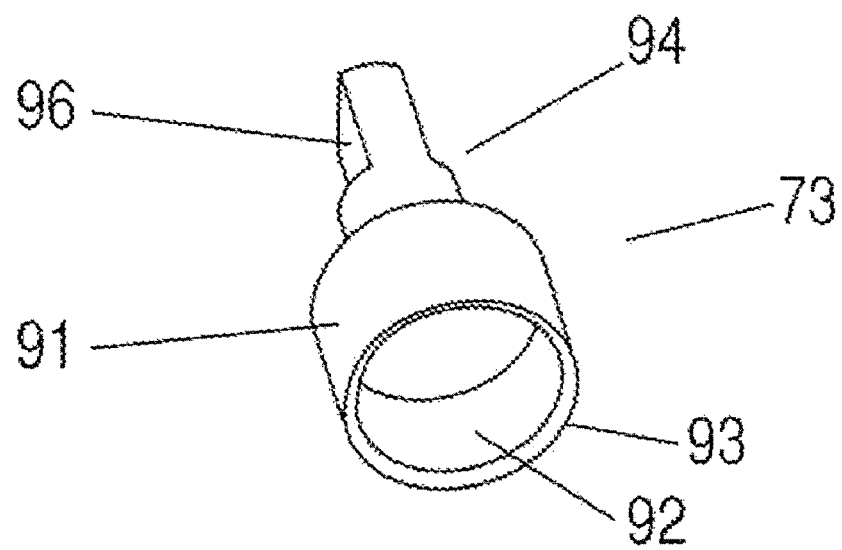
Figure 3B:
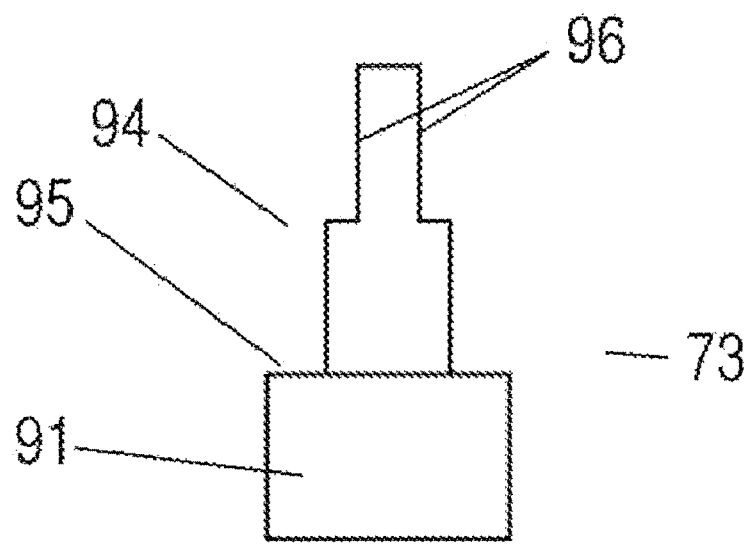

An example of a bushing installation tool 73 utilized in tandem with the method illustrated in FIG. 1A and FIG. 1B, and a bushing as illustrated in FIG. 2A and FIG. 2B is illustrated in FIG. 3A and FIG. 3B. The bushing installation tool 73, as illustrated, includes a cylindrical alignment member 91 with a diameter slightly less than the diameter of the aperture created by the inner annular ridge 75, thereby allowing the bushing installation tool 73 to be inserted and passed through the shift cable end 71. The cylindrical alignment member 91 includes a non-yieldable, cylindrical cavity 92 carried in the trailing end 93 of the cylindrical member 91 for radially and uniformly compressing the leading shoulder 83 of the bushing 72 without forcing or distorting the bushing 72. The non-yieldable cavity 92 is of a depth equal to the length of longitudinal edge of the leading shoulder 83 of the bushing 72. The cylindrical alignment member further carries an elongated member 94 extending perpendicularly from the leading surface 95 of the cylindrical alignment member 91. The elongated member 94 carries an indentation 96 on opposing sides of the elongated member 94 for gripping the bushing installation tool 73 as it is passed through the shift cable end 71.

As noted above, the leading shoulder 83 of the bushing 72 is radially and uniformly contracts as it is inserted into the non-yieldable cavity 92 of the bushing installation tool 73, thereby allowing the leading shoulder 83 of the bushing 72 to pass through the inner annular ridge 75 without being forced through the inner annular ridge 75 or distorted. Once the bushing 72 is inserted into the cavity 92, the bushing installation tool 73 is pressed into the shift cable end 71, such that the elongated member passes through the inner annular ridge 75. The bushing installation tool 73 is then pulled through the shift cable end 71 by engaging and pulling on the elongated member 94. As the bushing installation tool 73 is pulled through the shift cable end 71, the trailing shoulder 82 of the bushing 72 engages the inner annular ridge 75, and the leading shoulder 83 passes through and beyond the inner annular ridge 75 and radially and fully expands to its original form to secure the bushing 72 within the shift cable end 71.

The foregoing merely describes the present invention in an illustrative manner. The terminology employed is intended to be merely words of description, and not of limitation. It will thus be appreciated that that those skilled in the art will be able to make numerous modification and variations of the present invention in light of the above teachings. Such modifications and variations, while not illustrated or described herein, embody the principles of the present invention, and are within the spirit and scope of the appended claims.

The invention claimed is:

1. A method for installing a bushing into a bore, said bore having an inner annular ridge, said bushing having a sleeve carrying a tapered leading and trailing shoulder, said leading shoulder having a contraction means to allow for the uniform and radial contraction of the leading shoulder of the bushing without deforming or distorting the leading shoulder of the bushing, said method comprising:

inserting the leading shoulder of the bushing into a tool having a cylindrical member with a first side and a second side, a non-yieldable, cylindrical opening within the first side of the cylindrical member and an elongated member extending perpendicularly from the second side of the cylindrical member, thereby causing the leading shoulder of the bushing to radially and uniformly contract to a diameter less than the diameter of the inner annular ridge;

inserting said tool into one end of the bore and passing the leading shoulder of the bushing beyond on the inner annular ridge;

pulling said tool from the opposite end of the bore, thereby releasing the leading shoulder of the bushing to uniformly and radially expand to its original form and integrity and engage the bore and inner annular ridge.

2. A method for installing a bushing into a bore, said bore having an inner annular ridge, said bushing having a sleeve carrying a tapered leading and trailing shoulder, said leading shoulder having four triangular notches spaced evenly around the periphery of the leading shoulder to allow for the radial and uniform contraction of the leading shoulder without deforming or distorting the leading shoulder of the bashing, said method comprising:

inserting the leading shoulder of the bushing into a tool having a cylindrical member with a first side and a second side, a non-yieldable, cylindrical opening within the first side of the cylindrical member, said cylindrical opening having a diameter less than the diameter of the inner annular ridge and having a depth equal to the longitudinal edge of the leading shoulder of the bushing, and an elongated member extending perpendicularly from the second side of the cylindrical member, thereby causing the leading shoulder of the bushing to radially and uniformly contract to a diameter less than the diameter of the inner annular ridge without forcing or distorting the leading shoulder of the bushing;

inserting said tool into one end of the bore and passing the leading shoulder of the bushing beyond the inner annular ridge;

pulling said tool from the opposite end of the bore, thereby releasing the leading shoulder of the bushing to uniformly and radially expand to its original form and integrity and engage the bore and inner annular ridge.

* * * * *